US011755232B2

(12) United States Patent
Sangle

(10) Patent No.: US 11,755,232 B2
(45) Date of Patent: *Sep. 12, 2023

(54) TRANSFERRING OF SNAPSHOT DATA BLOCKS TO A VIRTUAL STORAGE VOLUME

(71) Applicant: Portworx, Inc., Mountain View, CA (US)

(72) Inventor: Ganesh Sangle, Los Altos, CA (US)

(73) Assignee: Pure Storage, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/559,480

(22) Filed: Dec. 22, 2021

(65) Prior Publication Data

US 2022/0113874 A1    Apr. 14, 2022

Related U.S. Application Data

(63) Continuation of application No. 16/117,331, filed on Aug. 30, 2018, now Pat. No. 11,237,750.

(51) Int. Cl.
*G06F 3/06* (2006.01)
(52) U.S. Cl.
CPC .............. *G06F 3/065* (2013.01); *G06F 3/067* (2013.01); *G06F 3/0611* (2013.01); *G06F 3/0619* (2013.01); *G06F 3/0665* (2013.01)
(58) Field of Classification Search
CPC ...... G06F 3/065; G06F 3/0611; G06F 3/0619; G06F 3/0665; G06F 3/067
See application file for complete search history.

(56) References Cited

U.S. PATENT DOCUMENTS

| | | | |
|---|---|---|---|
| 8,135,930 B1* | 3/2012 | Mattox | G06F 3/0617 |
| | | | 711/100 |
| 10,310,760 B1 | 6/2019 | Dreier et al. | |
| 10,365,982 B1 | 7/2019 | Brooks et al. | |
| 10,452,296 B1* | 10/2019 | Greenwood | G06F 3/065 |
| 10,454,810 B1 | 10/2019 | Driscoll et al. | |
| 10,503,427 B2 | 12/2019 | Botes et al. | |
| 10,521,344 B1 | 12/2019 | Chawla et al. | |
| 10,558,537 B1 | 2/2020 | Colgrove et al. | |
| 10,585,733 B1 | 3/2020 | Colgrove et al. | |
| 10,613,779 B1 | 4/2020 | Brooks et al. | |
| 10,671,302 B1 | 6/2020 | Aggarwal et al. | |
| 10,671,408 B1 | 6/2020 | Colgrove et al. | |
| 10,680,932 B1 | 6/2020 | Colgrove et al. | |
| 10,698,775 B2 | 6/2020 | Horowitz | |
| 10,884,993 B1 | 1/2021 | Grunwald et al. | |
| 11,314,687 B2* | 4/2022 | Kavaipatti Anantharamakrishnan | G06F 16/182 |
| 2007/0011423 A1 | 1/2007 | Kaneda | |
| 2008/0256141 A1* | 10/2008 | Wayda | G06F 3/065 |
| | | | 707/999.203 |

(Continued)

*Primary Examiner* — Khoa D Doan
*Assistant Examiner* — Tong B. Vo
(74) *Attorney, Agent, or Firm* — ALG Intellectual Property, LLC

(57) ABSTRACT

An example method includes transferring, for each of a plurality of snapshots of a source virtual storage volume mounted at a first compute node, at least a portion of a plurality of data blocks for each of the snapshots to a target virtual storage volume at a second compute node; and after the data blocks are transferred, resynchronizing the target virtual storage volume with the source virtual storage volume.

20 Claims, 8 Drawing Sheets

(56) References Cited

U.S. PATENT DOCUMENTS

| | | |
|---|---|---|
| 2013/0013564 A1 | 1/2013 | Ben-Or |
| 2016/0306709 A1* | 10/2016 | Shaull |
| 2017/0154093 A1* | 6/2017 | Shetty ................ H04L 67/1095 |
| 2019/0065096 A1* | 2/2019 | Sterin ................ G06F 9/45558 |
| 2019/0213123 A1* | 7/2019 | Agarwal ................ G06F 3/0608 |
| 2019/0354450 A1 | 11/2019 | Grunwald et al. |
| 2019/0354628 A1 | 11/2019 | Grunwald et al. |
| 2019/0356609 A1 | 11/2019 | Grunwald et al. |
| 2020/0004438 A1 | 1/2020 | Jagannatha |
| 2020/0264960 A1 | 8/2020 | Brooks et al. |

* cited by examiner

TRANSFERRING OF SNAPSHOT DATA BLOCKS TO A VIRTUAL STORAGE VOLUME

RELATED APPLICATIONS

This application is a continuation of U.S. patent application Ser. No. 16/117,331 filed on Aug. 30, 2018, which is hereby incorporated herein by reference its entirety and for all purposes.

TECHNICAL FIELD

The present disclosure relates generally to containerized applications and more specifically to containerized scalable storage applications.

DESCRIPTION OF RELATED ART

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to methods, systems, device, and computer readable media associated with the replication of a source virtual storage volume. According to various embodiments, a plurality of snapshots of a source virtual storage volume may be created. The source virtual storage volume may be mounted at a first compute node that includes a first processor and a first memory module. Each of the snapshots may identify a respective plurality of data blocks included in the source virtual storage volume. The plurality of snapshots may be sequential in time.

In some implementations, for each of the snapshots in sequential order, at least a portion of the respective plurality of data blocks for each of the snapshots may be transferred to a second compute node that includes a second processor and a second memory module. The transferred data blocks may be stored on a target virtual storage volume at the second compute node. After the data blocks are transferred, the target virtual storage volume may be resynchronized with the source virtual storage volume so that the target virtual storage volume actively replicates the source virtual storage volume.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
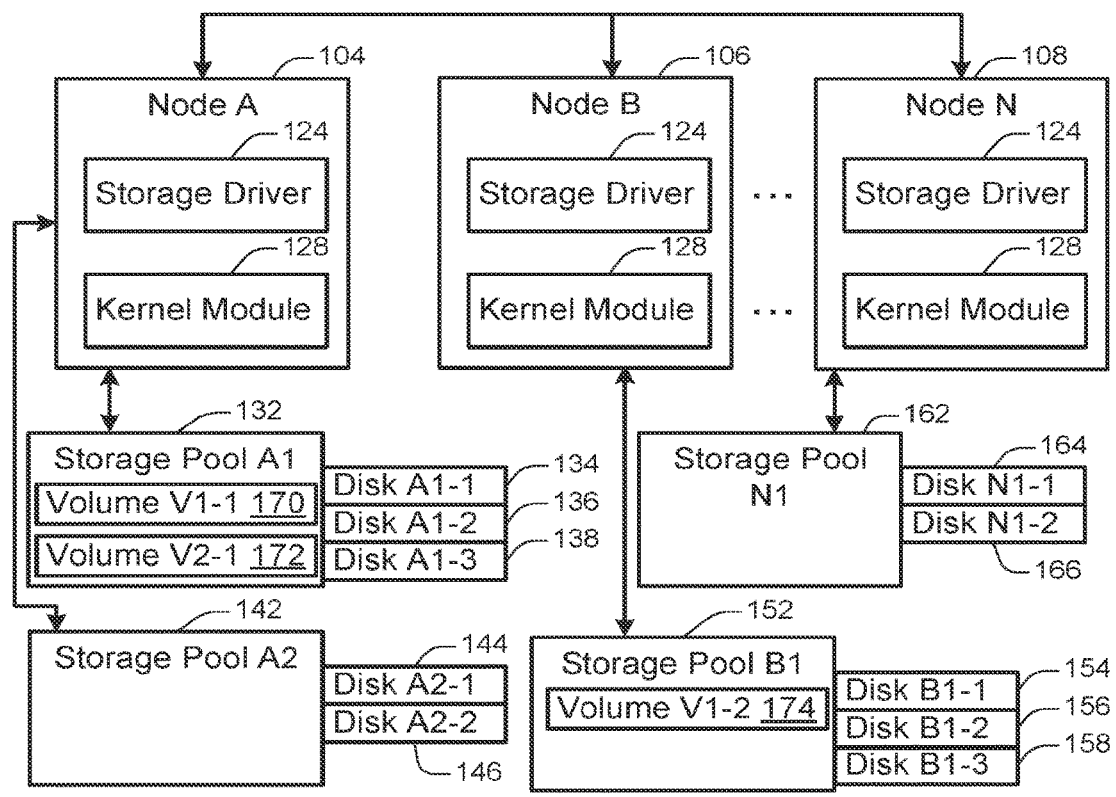
FIG. 1 illustrates an example of an arrangement of components in a distributed storage system, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

According to various embodiments, a virtual storage volume may provide storage for one or more applications. A virtual storage volume can span one or more different physical disks and can be made accessible to potentially many different compute nodes. However, a virtual storage volume will often be mounted on a specific compute node for the purpose of avoiding conflicts and race conditions in writing data to the storage volume.

In some configurations, a virtual storage volume may be replicated in the sense that more than one copy of the data is maintained. When a virtual storage volume is replicated, an instruction to write data to the virtual storage volume is split and then applied to each of the replicas. The replication factor of a virtual storage volume identifies the number of replicas being maintained.

In some implementations, maintaining two or more replicas of a virtual storage volume can provide any of a variety of advantages. For example, requests to read data from the virtual storage volume can be divided among the different replicas, potentially reducing network traffic for the system as a whole and/or input/output (I/O) loads for individual nodes.

In some configurations, it may be necessary or desired to increase the replication factor of a virtual storage volume while the virtual storage volume is in use. For example, an increased replication factor may help to accommodate an increase in I/O traffic for the virtual storage volume over time.

However, conventional approaches to increasing the replication factor of a virtual storage volume impose considerable disruption to the use of the system. For example, under a conventional approach, increasing the replication factor of a virtual storage volume may involve first freezing access to the virtual storage volume. When the volume is frozen, read and write access to the virtual storage volume may be temporarily halted, while read and write requests may be queued for later execution. The contents of the volume may be copied from the existing copies of the storage volume to a newly created replica, which may require a considerable amount of time for a large virtual storage volume. Only when the copying is completed is the virtual storage volume unfrozen. Even then, the queued read and write requests must be executed before resuming normal operations. Particularly in high-bandwidth, high-accessibility environments, the disruption imposed by this conventional approach is often deemed unacceptable.

Techniques and mechanisms described herein facilitate the increase in virtual storage volume replication factor. According to various embodiments, the increase in a virtual storage volume's replication factor may be divided into two phases. In the transfer phase, one or more snapshots are used to iteratively copy data from the virtual storage volume to a newly added replica of the virtual storage volume. In the resynchronization phase, recently changed data is synchronized between the virtual storage volume and the newly added replica.

In some embodiments, techniques and mechanisms described herein facilitate the increase in virtual storage volume replication factor without the attendant disruption associated with conventional approaches. For example, the replication factor of a virtual storage volume may be increased without blocking access to the virtual storage volume. Thus, techniques and mechanisms described herein provide for more efficient scaling of virtual storage volumes, which allows for the more efficient usage of computing resources. Accordingly, embodiments of the claimed invention provide for the improved performance of the computer and distributed computing system itself.

In some implementations, techniques and mechanisms described herein may provide one or more of the following technical advantages. First, the replication factor of a volume may be increased without incurring volume downtime. Second, data may be transferred in parallel, providing for rapid increase in the replication factor. Third, data transfer speeds may be configured, providing for configurability and efficiency in the use of computing resources. Fourth, procedures described herein may be restarted in the sense that they may be resumed in place after the failure and restarting of any of the source or target replicas.

Techniques and mechanisms described herein facilitate the operation of a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, each compute node may include a storage driver configured to facilitate access between applications loaded on the compute node and one or more storage volumes mounted on the compute node. The storage driver may be implemented as a containerized application having special permissions beyond those typically accorded to containerized applications in the system, a configuration referred to herein as a privileged storage container. Techniques and mechanisms related to privileged storage containers are discussed in further detail with respect to FIG. 6.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

FIG. 1 illustrates an example of an arrangement of components in a containerized storage system 100, configured in accordance with one or more embodiments. The storage system 100 includes application nodes 104, 106, and 108. Each node has implemented thereon a storage driver 124 and a kernel module 128. Each node has access to zero or more storage pools such as the storage pools A1 132, A2 142, B1 152, and N1 162. Each storage pool includes zero or more virtual storage volumes such as the virtual storage volumes V1-1 170, V2-1 172, and V1-2 174. Each virtual storage volume includes storage space on one or more disks associated with the storage pool such as the disks A1-1 134, A1-2 136, A1-3 138, A2-1 144, A2-2 146, N1-1 164, N1-2 166, B1-1 154, B1-2 156, and B1-3 158.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
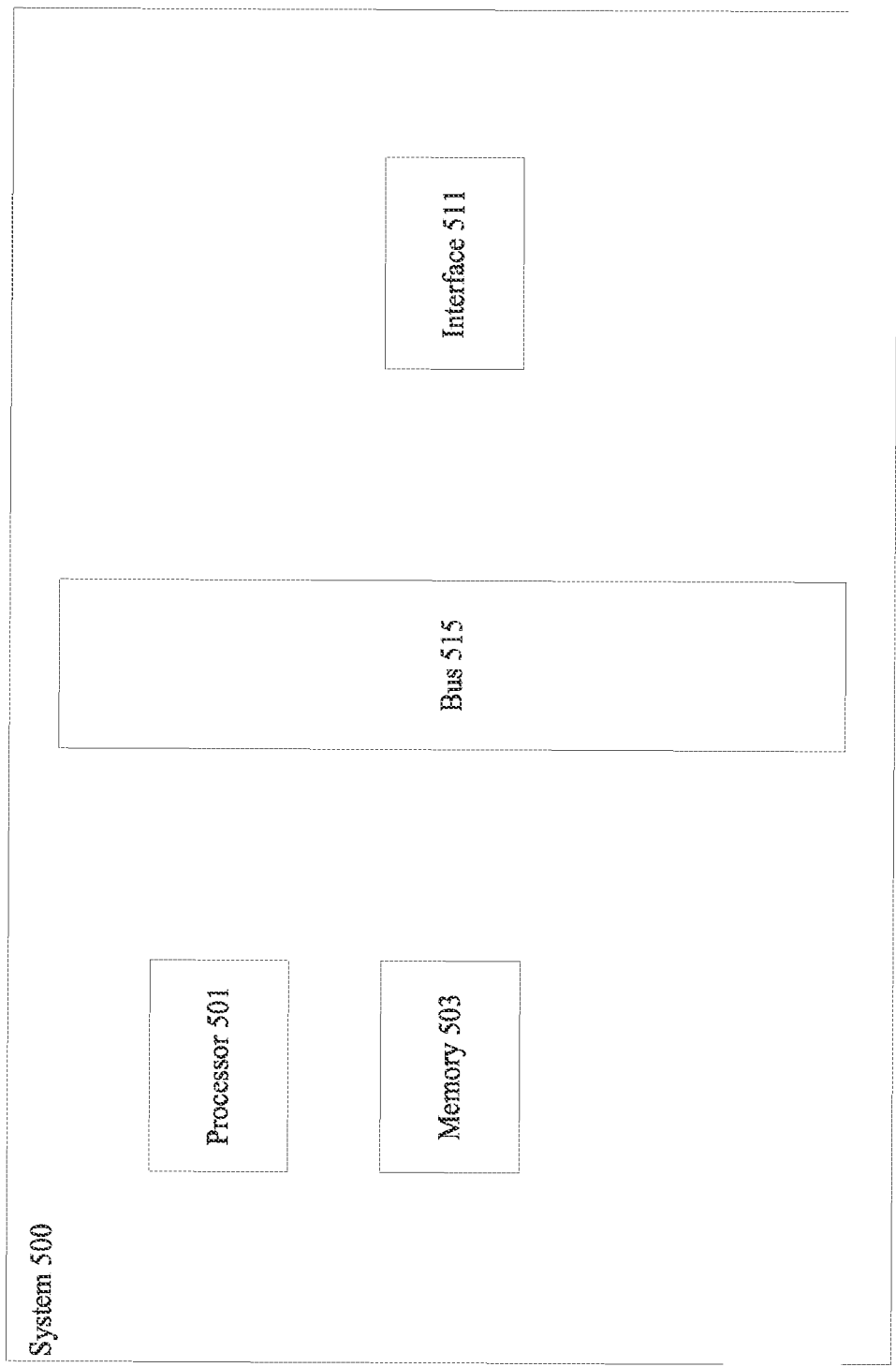
FIG. 5 illustrates an example of a server, configured in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 6.

According to various embodiments, each node may be configured to instantiate and execute one or more containerized application instance. Each node may include many components not shown in FIG. 1. These components may include hardware components, such as those discussed with respect to FIG. 5, and/or software components, such as those discussed herein.

According to various embodiments, each node may include a storage driver 124. The storage driver 124 may perform any of various types of storage-related operations for the node. For example, the storage driver 124 may facilitate the mounting or unmounting of virtual storage volumes. As another example, the storage driver 124 may facilitate data storage or retrieval requests associated with a mounted virtual storage volume. The storage driver 124 may be substantially similar or identical to the privileged storage container 616 shown in FIG. 6.

In some embodiments, each node may include a kernel module 128. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as the pool 132 may include potentially many different disks.

According to various embodiments, the virtual storage volumes 170, 172, and 174 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some implementations, each virtual storage volume may include zero or more replicas. For example, the storage volume V1-1 170 on the Node A 104 includes the replica V1-2 174 on the Node B 106. Replicating a virtual storage volume may offer any of various computing advantages. For example, each replica may be configured to respond to data read requests, so increasing the replication factor may increase read access bandwidth to the virtual storage volume. As another example, replicas may provide redundancy in the event of a software and/or hardware failure associated with the storage volume.

Figure 2:
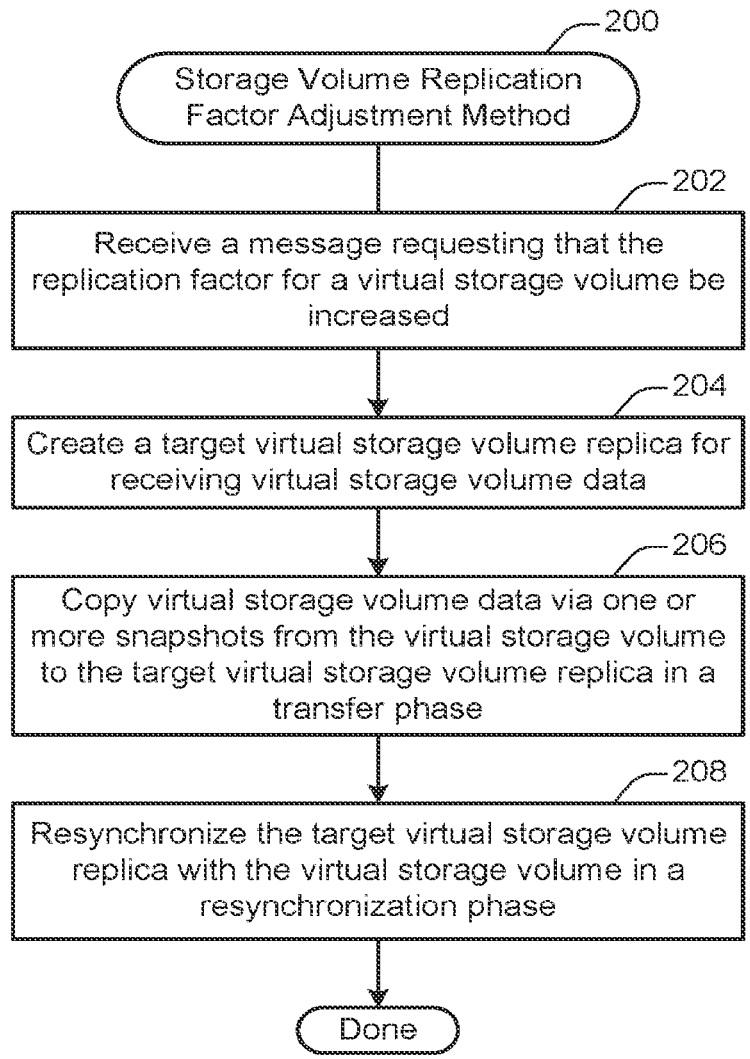
FIG. 2 illustrates an example of a storage volume replication factor adjustment method, performed in accordance with one or more embodiments.

FIG. 2 illustrates an example of a storage volume replication factor adjustment method 200, performed in accordance with one or more embodiments. According to various embodiments, the method 200 may be performed when a request is received at operation 202, to increase the replication factor for a virtual storage volume. For instance, a request may be received to increase the replication factor of the storage volume V1 shown in FIG. 1 to include an additional replica on the Node N 108.

In particular embodiments, such a request may be generated manually, for instance by a systems administrator. Alternately, such a request may be generated automatically. For instance, an application may transmit a request to increase the replication factor of a storage volume when a designated I/O threshold is reached.

According to various embodiments, various operations associated with FIG. 2 may be performed at any of several nodes, such as the Node A 104, Node B 106, and/or Node N 108 shown in FIG. 1. The coordinator may perform any or all of various command and control functions for the replicated storage volume. For example, the coordinator may transmit instructions to increase or decrease the replication factor of the storage volume. As another example, the coordinator may receive requests to write data to the storage volume and then transmit those requests to each of the replicas in order to maintain data consistency and integrity across the replicas.

In some configurations, the coordinator node 104 may be a distinct node without an attached replica of the storage volume. Alternately, the coordinator node 104 may include a replica of the storage volume. For example, in the system 100 shown in FIG. 1, the coordinator node may be implemented as a module on the Node A 104 or the Node N 108.

A target virtual storage volume replica is created for receiving virtual storage volume data at 204. The target virtual storage volume replica may be created by performing any or all of a range of suitable operations. The target virtual storage volume replica may be provisioned with a size suitable for receiving the virtual storage volume data. For example, different replicas associated with the same storage volume may be maintained at comparable sizes to facilitate data and performance consistency across the replicas.

At 206, virtual storage volume data is copied via one or more snapshots from the virtual storage volume to the target virtual storage volume replica in a transfer phase. Techniques associated with the copying of data via one or more snapshots are discussed in additional detail with respect to the method 300 shown in FIG. 3.

At 208, the target virtual storage volume replica is resynchronized with the virtual storage volume in a resynchronization phase. Techniques associated with the resynchronization of a target virtual storage volume replica with the virtual storage volume are discussed in additional detail with respect to the method 400 shown in FIG. 4.

Figure 3:
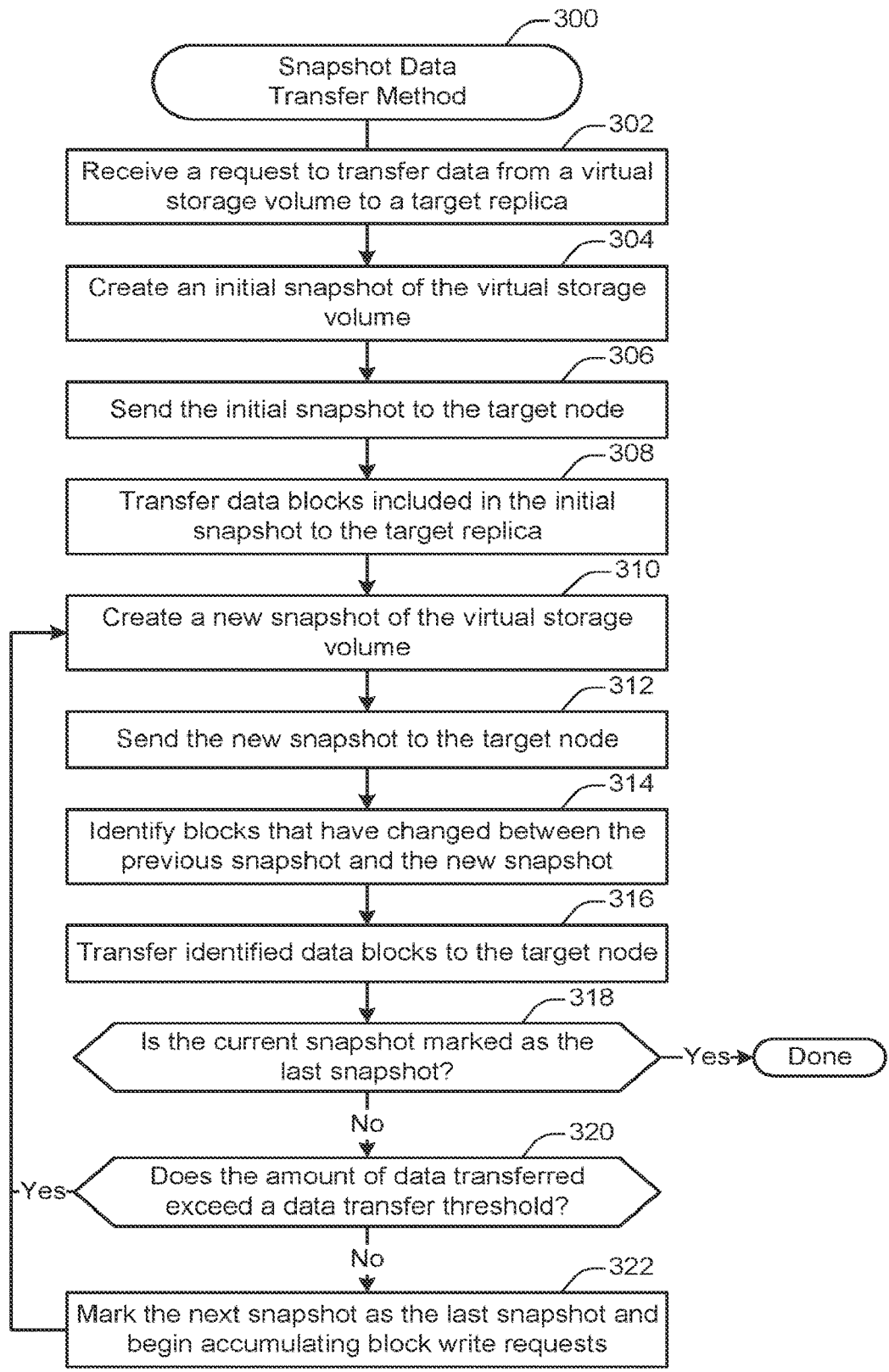
FIG. 3 illustrates an example of a method for transferring data via one or more snapshots, performed in accordance with one or more embodiments.

FIG. 3 illustrates an example of a method 300 for transferring data via one or more snapshots, performed in accordance with one or more embodiments. The method 300 may be performed at one or more components of the system 100 shown in FIG. 1.

In some embodiments, the method 300 may be initiated when a request is received at operation 302 to transfer data from a virtual storage volume to the target replica. For example, a request may be received to increase the replication factor the virtual storage volume by adding a target replica, such as a new replica for the Volume V2 on the Node N 108 shown in FIG. 1.

A new snapshot is created at operation 304. According to various embodiments, creating a new snapshot may involve constructing a list of blocks included within a snapshot at a designated point in time. For example, the storage driver may maintain a table of block identifiers and block locations to facilitate access to the data blocks. Because the volume is implemented within a copy-on-write framework, subsequent data write requests that write to the data blocks included within the snapshot will not lead to the corruption of the snapshot. Techniques for copy-on-write data management are discussed with respect to FIG. 7.

At 306, the initial snapshot is sent to the target node. In some implementations, transmitting the initial snapshot to the target node may involve sending a message with an identifier associated with the initial snapshot. In addition, the target node may receive a list of the block identifiers for blocks included in the snapshot.

308, the data blocks included in the initial snapshot are transferred to the target replica. According to various embodiments, the blocks may be transferred via any suitable transfer procedure. For example, the list of data blocks may be divided into chunks. The chunks may then be retrieved in parallel from each previously created virtual storage volume replica. When a block is retrieved, the data may be stored on the target replica. Although a block may keep the same identifier when transferred from the volume to the target replica, the location at which it is stored will be different because the target replica employs different hardware storage resources than the source volume, as discussed with respect to FIG. 1.

After transferring the data blocks included in the initial snapshot to the target replica, the target replica is synchronized with the source volume up to the point in time when the initial snapshot was captured. However, the source volume may have continued to receive data write requests after the initial snapshot was generated. Accordingly, at operation 310, a new snapshot is created.

According to various embodiments, the generation of the new snapshot may be performed in a manner substantially similar to the generation of the initial snapshot at operation 304. After the new snapshot is generated, it is sent to the target node at operation 312 in a manner substantially similar to that in which the initial snapshot is sent at operation 306.

At 314, blocks that have changed between the previous snapshot and the new snapshot are identified. According to various embodiments, the changed blocks may be identified by any suitable method. For example, block identifiers in the previous and new snapshots may be compared to identify newly added or removed blocks. In some implementations, the identification of changed blocks may be performed by a node associated with the source volume. Alternately, or additionally, the target node may identify changed or newly added blocks.

After the blocks are identified, they are transferred from the virtual storage volume to the target replica at operation 316. According to various embodiments, the transfer of the identified data blocks may be performed in a manner substantially similar to that discussed with respect to the operation 314.

At 318, a determination is made as to whether the current snapshot is marked as the last snapshot. According to various embodiments, such a marking may occur in a previous iteration at operation 322. For example, if it is determined that the amount of data transferred does not exceed a designated data transfer threshold at operation 320, then the next snapshot may be marked as the last snapshot at operation 322.

In some embodiments, the procedure 300 may terminate after the processing of the last snapshot. At this point, the amount of data transferred has fallen to an acceptably low point such that the state of the target replica is relatively close to that of the other replicas in the virtual storage volume. Accordingly, the target replica may be synchronized directly via a resynchronization process as described with respect to the method 400 shown in FIG. 4 based at least in part on the block write requests accumulated at operation 322.

If the current snapshot is not marked as the last snapshot, then a determination is made at 320 as to whether the amount of data transferred at operation 316 exceeds a data transfer threshold. If so, then at least two additional iterations of the snapshot data transfer method are performed.

In some implementations, the data transfer threshold may be specified in blocks, bytes, or any suitable unit of measure. The specific value used for the data transfer threshold may be strategically determined based on any of a number of considerations, which may include, but are not limited to: a storage volume size associated with the virtual storage volume and/or an amount of data written to the virtual storage volume during a designated period of time.

When the current snapshot is marked as the last snapshot at operation 318, the next snapshot is marked as the last snapshot and subsequent data write requests received are accumulated at operation 322. According to various embodiments, marking the next snapshot as the last snapshot may involve setting any suitable indicator such that the procedure terminates after the next execution of the operation 318.

In some implementations, block write requests are received by a coordinator node and then transferred to each node that has a replica of the virtual storage volume. Accordingly, block write requests may be accumulated by including the target node in the distribution of block write requests received after the last snapshot is generated. Each block write request may include information such as data to write to disk and a location such as one or more block identifiers at which to write the data.

In particular embodiments, block write requests may be executed in a sequential manner since one block write request may modify a data block written to by a previously received block write request. Accordingly, the block write requests may be accumulated in the sense that the target node may not actually execute the block write requests until the target node is fully synchronized with the virtual storage volume. During the accumulation process, the data write requests may continue to be executed as usual by replicas of the virtual storage volume other than the target replica. The resynchronization process is discussed in further detail with respect to FIG. 4.

Figure 4:
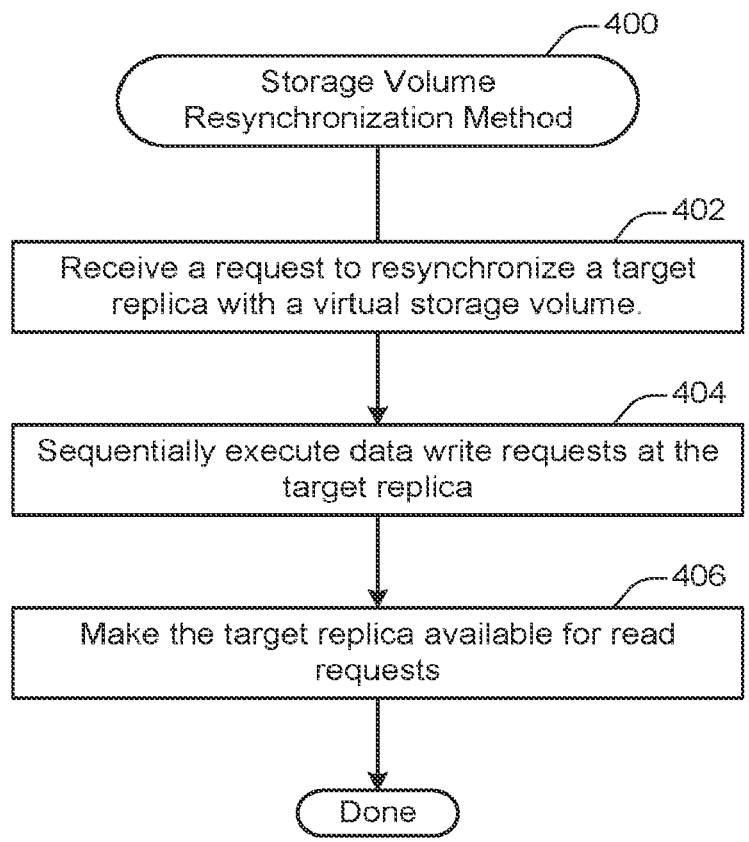
FIG. 4 illustrates an example of a method of resynchronizing a storage volume, performed in accordance with one or more embodiments.

FIG. 4 illustrates an example of a method 400 of resynchronizing a storage volume, performed in accordance with one or more embodiments. The method 400 may be performed at a replica node, such as the Node 106 shown in FIG. 1.

In some implementations, the method 400 may be performed when a request is received at 402 to resynchronize a target replica with a virtual storage volume. For example, such a request may be received as discussed at operation 208 after virtual storage volume data has been copied from the virtual storage volume to the virtual storage volume replica as described with respect to operation 206 shown in FIG. 2.

At 404, data write requests received at the target replica are executed. In some implementations, the data write requests executed at operation 404 may include those accumulated at operation 322. As discussed with respect to operation 322, accumulated data write requests may be transferred to the target replica for later execution.

According to various embodiments, the data write requests requests may be executed sequentially. For example, a particular data write requests may modify a data block that is later overwritten by a subsequent write request. Accordingly, data synchronicity across the replicas may be maintained by executing write requests in the order in which they are received.

In particular embodiments, one or more operations shown in FIG. 3 may be performed in parallel or in an order different than that shown. For example, a set of data write requests may be executed in parallel if the data blocks written by the data write requests do not overlap.

At 406, the target replica is made available for read requests. In some implementations, after the data write requests are executed, the target replica has a complete copy of the virtual storage volume and is effectively identical to the source replicas of the virtual storage volume.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine and/or a storage container node as shown herein. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
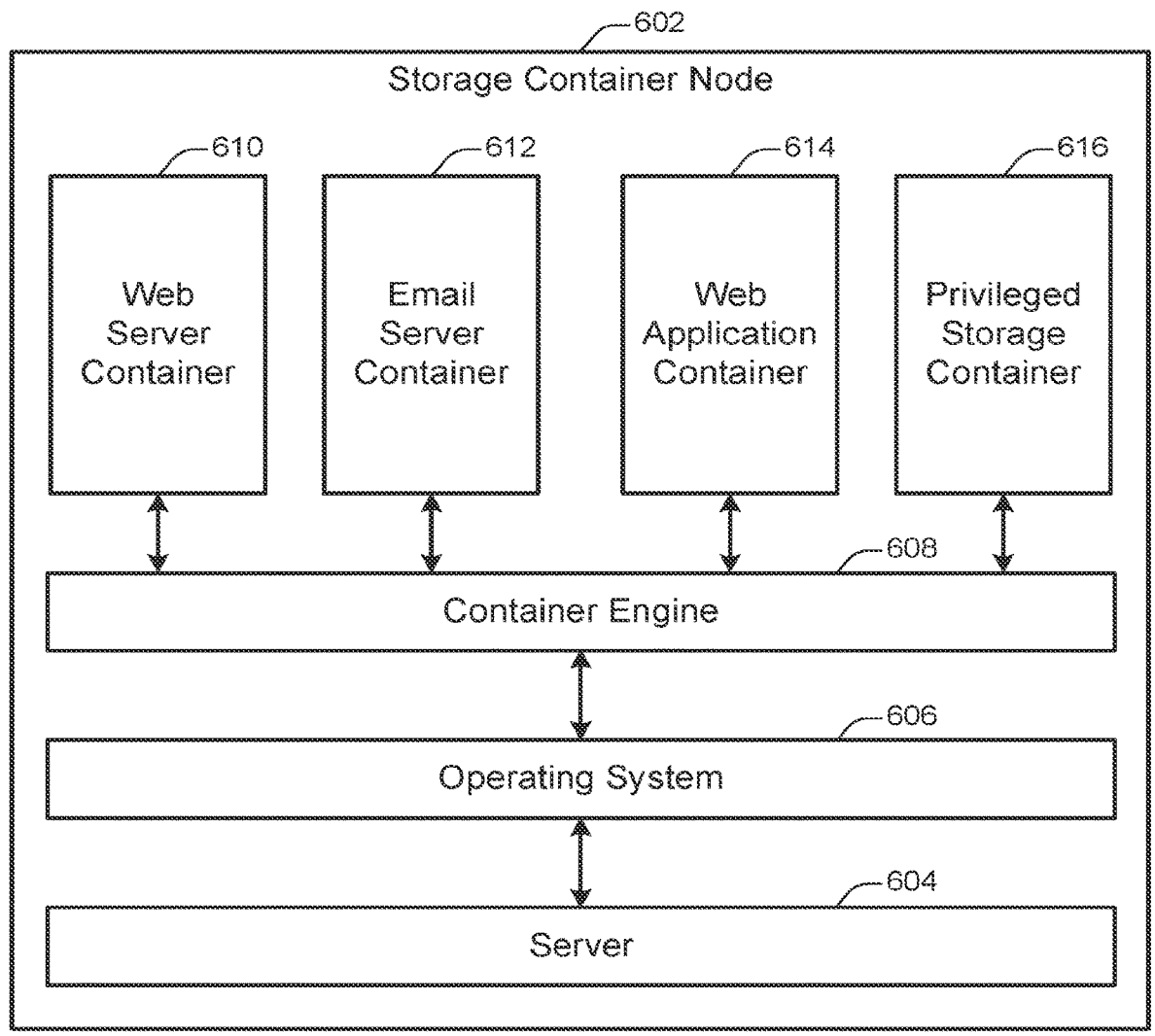
FIG. 6 illustrates an example of a storage container node, configured in accordance with one or more embodiments.

FIG. 6 illustrates an example of a storage container node 602. According to various embodiments, a storage container node may be a server configured to include a container engine and a privileged storage container. The storage container node 602 shown in FIG. 6 includes a server layer 604, an operating system layer 606, a container engine 608, a web server container 610, an email server container 612, a web application container 614, and a privileged storage container 616.

In some embodiments, the storage container node 602 may serve as an interface between storage resources available at a server instance and one or more virtual storage volumes that span more than one physical and/or virtual server. For example, the storage container node 602 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 602 may serve as an interface between storage resources available at a server instance and one or more virtual storage volumes that are replicated across more than one physical and/or virtual server. For example, the storage container node 602 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 604, the server layer is shown. According to various embodiments, the server layer may function as an interface by which the operating system 606 interacts with the server on which the storage container node 602 is implemented. A storage container node may be implemented on a virtual or physical server. For example, the storage container node 602 may be implemented at least in part on the server shown in FIG. 5. The server may include hardware such as networking components, memory, physical storage devices, and other such infrastructure. The operating system layer 606 may communicate with these devices through a standardized interface provided by the server layer 604.

At 606, the operating system layer is shown. According to various embodiments, different computing environments may employ different operating system layers. For instance, a physical or virtual server environment may include an operating system based on Microsoft Windows, Linux, or Apple's OS X. The operating system layer 606 may provide, among other functionality, a standardized interface for communicating with the server layer 604.

At 608, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 604, an operating system layer 606, and a container engine layer 608 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 602 includes the web server container 610, the email server container 612, and the web application container 614. A software container may include customized computer code configured to perform any of various tasks. For instance, the web server container 610 may provide files such as webpages to client machines upon request. The email server 612 may handle the receipt and transmission of emails as well as requests by client devices to access those emails. The web application container 614 may be configured to execute any type of web application, such as an instant messaging service, an online auction, a wiki, or a webmail service. Although that storage container node 602 shown in FIG. 6 includes three software containers, other storage container nodes may include various numbers and types of software containers.

At 616, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 610, 612, and 614 or other software containers located in different computing environments. For example, a software container may transmit a storage request to the container engine 608 via a standardized interface. The container engine 608 may transmit the storage request to the privileged storage container 616. The privileged storage container 616 may then communicate with privileged storage containers located on other storage container nodes and/or may communicate with hardware resources located at the storage container node 602 to execute the request. In some configurations, a privileged storage container is referred to herein as a scheduler agent.

In some implementations, one or more software containers may be afforded limited permissions in the computing environment in which they are located. For example, in order to facilitate a containerized software environment, the software containers 610, 612, and 614 may be restricted to communicating directly only with the container engine 608 via a standardized interface. The container engine 608 may then be responsible for relaying communications as necessary to other software containers and/or the operating system layer 606.

In some implementations, the privileged storage container 616 may be afforded additional privileges beyond those afforded to ordinary software containers. For example, the privileged storage container 616 may be allowed to communicate directly with the operating system layer 606, the server layer 604, and/or one or more physical hardware components such as physical storage devices. Providing the storage container 616 with expanded privileges may facilitate efficient storage operations such as storing, retrieving, and indexing data.

Figure 7:
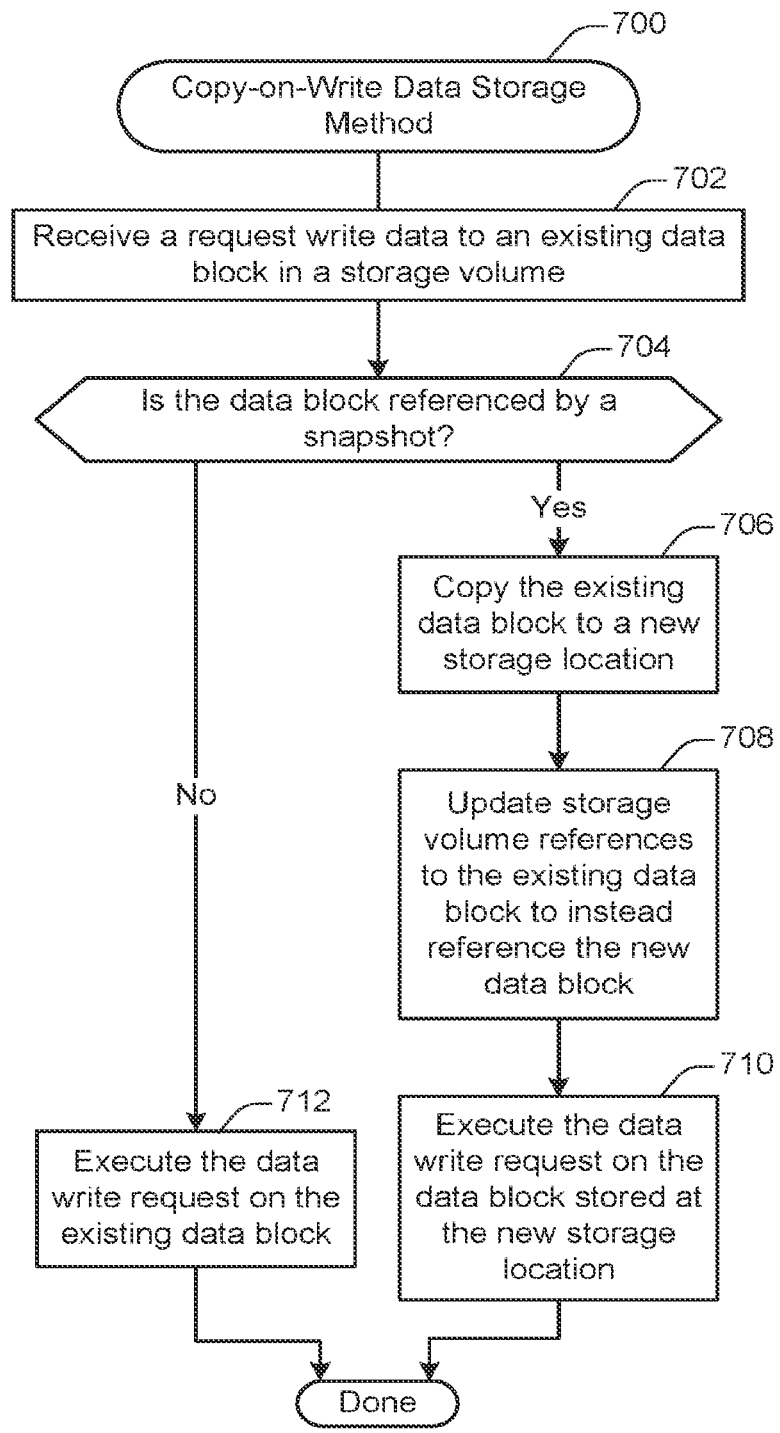
FIG. 7 illustrates an example of a method for storing data in a copy-on-write storage system, performed in accordance with one or more embodiments.

FIG. 7 illustrates an example of a method 700 for storing data in a copy-on-write storage system, performed in accordance with one or more embodiments. According to various embodiments, the method 700 may be performed in order to execute a write request that changes the state of data on a storage volume.

A request to write data to an existing data block in a storage volume is received at operation 702. In some embodiments, the request may include information such as a reference to a storage location of the data block, data to write to the data block, and a portion of the data block to be overwritten.

At 704, a determination is made as to whether the data block is referenced by a snapshot. According to various embodiments, the determination may be made at least in part by consulting a table that lists references to data blocks stored in association with the storage volume. If the data block is not referenced by a snapshot, then the data write request may be executed on the existing data block at operation 712.

If instead the data block is referenced by a snapshot, then at 706 the existing data block is copied to a new storage location. Storage volume references to the existing data block are then updated to refer to the new data block at the new storage location at operation 708. The references that are updated may exclude those that are included in a snapshot so that the snapshots continue to refer to the existing data block as it is maintained in its previous state.

At 710, the data write request is executed on the data block stored at the new storage location. According to various embodiments, executing the data write request may involve writing the data identified in the request received at 702 to the appropriate location within the data block.

Figure 8:
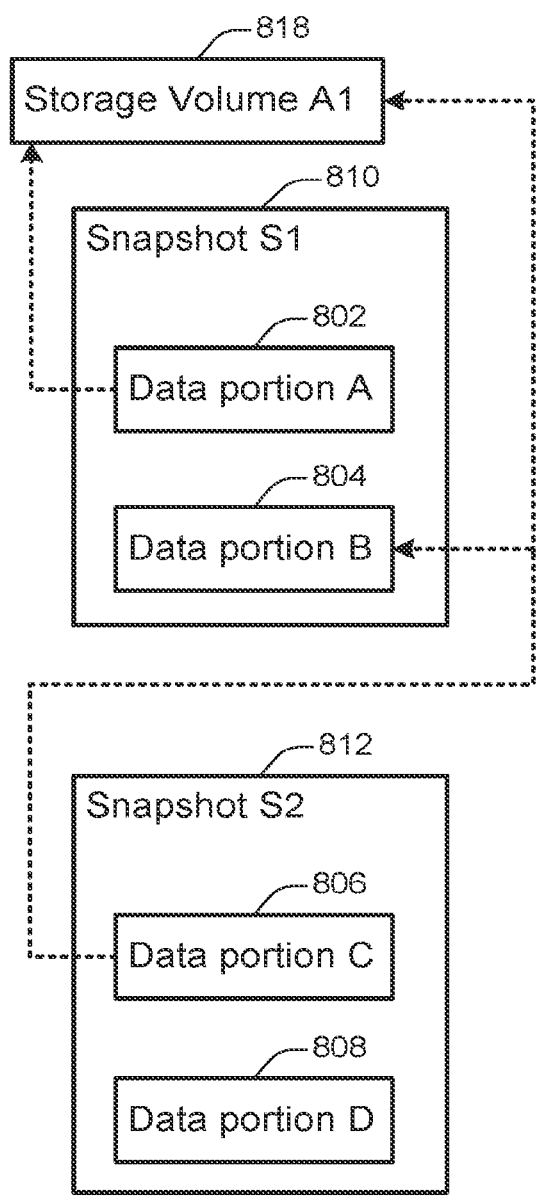
FIG. 8 illustrates an example of a configuration of data, provided in accordance with one or more embodiments.

FIG. 8 illustrates an example of a configuration of data, provided in accordance with one or more embodiments. The configuration of data shown in FIG. 8 includes Snapshot S1 810 and Snapshot S2 812, both of which correspond to Volume A1 818. The snapshots included data portions A-D 802-808.

According to various embodiments, a virtual storage volume may include some number of data blocks. Some of those data blocks may be associated with a current state of the virtual storage volume. Other data blocks may be associated with a previous state of the virtual storage volume. For instance, these other data blocks may have been overwritten by subsequent data write requests.

In some implementations, in order to perform operations such as restoring the virtual storage volume to a previous state and/or increasing a replication factor of a virtual storage volume, a request to overwrite a data block may be implemented as a copy-on-write, in which the original data is duplicated prior to executing the write request. In this way, the data block exists in both its overwritten and previous state, which facilitates the creation of snapshots capable of being used to restore the storage volume to a state at a particular point in time.

According to various embodiments, a snapshot itself may include a list of identifiers associated with data blocks associated with the virtual storage volume. Snapshots may be captured in a sequentially significant manner. In the example configuration shown in FIG. 8, the Snapshot S1 810 represents the first snapshot captured of the Volume A1 818. The data included in the Snapshot S1 810 includes two portions. The data portion A 802 includes data blocks that currently remain in Volume A1 818. Because the data blocks included in data portion A 802 are still in Volume A1 818, the Snapshot S1 810 does not store a copy of the data blocks included in data portion A 802. Instead, the data portion A 802 is stored as a set of one or more references to the data blocks as they reside in the Volume A1. For example, a reference may act as a memory pointer, which typically requires substantially less storage space than the memory to which it refers.

The data portion B 804 includes data blocks that were present in the Volume A 818 at the time the Snapshot S1 810 was captured but is no longer present in the Volume A 818 at the current point in time. A copy of this data is stored in association with the Snapshot S1 810 so that it is available if a request to restore the system to the state represented in the Snapshot S1 810 is received.

The Snapshot S2 812 represents the second snapshot captured of the Volume A1 818. The data blocks included in the Snapshot S2 812 include two portions. The data portion C 806 includes data blocks included in the Snapshot S1 810. Because the data blocks included in data portion C 806 are still in the Snapshot S1 810, the Snapshot S2 812 does not store a copy of the data blocks included in data portion C 806. Instead, the data portion C 806 is stored as a set of one or more references to the data blocks as they reside in the Snapshot S2 812.

In particular embodiments, the references in the data portion C 806 may be pointers to data blocks stored in the Snapshot S1 810 (e.g., in the data portion B 804) or may be pointers to references to data blocks stored in the storage volume A1 818. For example, some of these references may point to data blocks stored by value in the Snapshot S1 810 (i.e. in the data portion B 804) that no longer remain in the Storage Volume A1 818. As another example, other references may point to data blocks that do remain in the Storage Volume A1 818. Thus, the data portion C 806 and the data portion A 802 may include some of the same references to data blocks that remain in the storage volume A1 818.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:

transferring, for each of a plurality of snapshots of a source virtual storage volume mounted at a first compute node, at least a portion of a plurality of data blocks for each of the plurality of snapshots to a target virtual storage volume at a second compute node, the transferring comprising transferring, in parallel from a plurality of previously created virtual storage volumes that each replicates the source virtual storage volume and are mounted at a plurality of compute nodes different than the first and second compute nodes, chunks representative of a plurality of data blocks identified by a particular snapshot included in the plurality of snapshots; and after the at least the portion of the plurality of data blocks are transferred, resynchronizing the target virtual storage volume with the source virtual storage volume, the resynchronizing comprising transmitting, from the source virtual storage volume to the target virtual storage volume, one or more data write requests received at the source virtual storage volume after a creation of a last one of the plurality of snapshots, the last one of the plurality of snapshots being associated with a point in time later than all other snapshots of the plurality of snapshots.

2. The method recited in claim 1, wherein the plurality of snapshots include a first snapshot and a second snapshot, the first snapshot including first snapshot data capturing a first data state of the source virtual storage volume at a first point in time, the second snapshot including second snapshot data capturing a second data state of the source virtual storage volume at a second point in time, the second point in time being later than the first point in time.

3. The method recited in claim 2, the method further comprising:
identifying a first portion of data blocks included in the first snapshot data but not included in the second snapshot data.

4. The method recited in claim 3, the method further comprising:
identifying a second portion of data blocks included in the first snapshot data and included in the second snapshot data.

5. The method recited in claim 4, wherein the transferring of the at least the portion of the respective plurality of data blocks associated with the first snapshot includes transferring the first portion of data blocks.

6. The method recited in claim 5, wherein the second portion of data blocks is not transferred when transferring the respective plurality of data blocks associated with the second snapshot.

7. The method recited in claim 6, the method further comprising:
determining whether a data size associated with the second portion of data blocks exceeds a designated data transfer size threshold.

8. The method recited in claim 7, wherein the target virtual storage volume is resynchronized with the source virtual storage volume when it is determined that the data size associated with the second portion of data blocks does not exceed the designated data transfer size threshold.

9. The method recited in claim 1, wherein the source virtual storage volume includes storage space on a plurality of disks accessible to the first compute node via a network.

10. The method recited in claim 1, wherein each of the first and second compute nodes includes a container engine application executed by an operating system, the container engine application providing a standardized platform for instantiation and execution of containerized applications.

11. The method recited in claim 10, wherein the containerized applications include a storage driver configured to manage the source virtual storage volume.

12. The method recited in claim 1, the method further comprising making a target replica available for executing data read requests.

13. A system comprising:
a first compute node configured to:
transmit, for each of a plurality of snapshots of a source virtual storage volume, at least a portion of a plurality of data blocks for each of the plurality of snapshots, the transmitting comprising transmitting, in parallel from a plurality of previously created virtual storage volumes that each replicates the source virtual storage volume and are mounted at a plurality of compute nodes different than the first compute node and a second compute node, chunks representative of a plurality of data blocks identified by a particular snapshot included in the plurality of snapshots;
wherein the second compute node is configured to:
receive the at least the portion of the plurality of data blocks for each of the plurality of snapshots at a target virtual storage volume; and
the first compute node configured to resynchronize the target virtual storage volume with the source virtual storage volume after the at least the portion of the plurality of data blocks are transferred by transmitting, from the source virtual storage volume to the target virtual storage volume, one or more data write requests received at the source virtual storage volume after a creation of a last one of the plurality of snapshots, the last one of the plurality of snapshots being associated with a point in time later than all other snapshots of the plurality of snapshots.

14. The system recited in claim 13, wherein the plurality of snapshots include a first snapshot and a second snapshot, the first snapshot including first snapshot data capturing a first data state of the source virtual storage volume at a first point in time, the second snapshot including second snapshot data capturing a second data state of the source virtual storage volume at a second point in time, the second point in time being later than the first point in time.

15. The system recited in claim 13, wherein the source virtual storage volume includes storage space on a plurality of disks accessible to the first compute node via a network, and wherein each of the first and second compute nodes includes a container engine application executed by an operating system, the container engine application providing a standardized platform for instantiation and execution of containerized applications, wherein the containerized applications include a storage driver configured to manage the source virtual storage volume.

16. One or more non-transitory machine-readable media having instructions stored thereon for performing a method, the method comprising:
transferring, for each of a plurality of snapshots of a source virtual storage volume mounted at a first compute node, at least a portion of a plurality of data blocks for each of the plurality of snapshots to a target virtual storage volume at a second compute node, the transferring comprising transferring, in parallel from a plurality of previously created virtual storage volumes that each replicates the source virtual storage volume and are mounted at a plurality of compute nodes different than the first and second compute nodes, chunks representative of a plurality of data blocks identified by a particular snapshot included in the plurality of snapshots; and
after the at least the portion of the plurality of data blocks are transferred, resynchronizing the target virtual storage volume with the source virtual storage volume, the resynchronizing comprising transmitting, from the source virtual storage volume to the target virtual storage volume, one or more data write requests received at the source virtual storage volume after a creation of a last one of the plurality of snapshots, the last one of the plurality of snapshots being associated with a point in time later than all other snapshots of the plurality of snapshots.

17. The one or more non-transitory machine-readable media recited in claim 16, wherein the plurality of snapshots include a first snapshot and a second snapshot, the first snapshot including first snapshot data capturing a first data state of the source virtual storage volume at a first point in time, the second snapshot including second snapshot data capturing a second data state of the source virtual storage volume at a second point in time, the second point in time being later than the first point in time.

18. The one or more non-transitory machine-readable media recited in claim 17, wherein the method further comprises identifying a first portion of data blocks included in the first snapshot data but not included in the second snapshot data.

19. The one or more non-transitory machine-readable media recited in claim 18, wherein the method further comprises identifying a second portion of data blocks included in the first snapshot data and included in the second snapshot data.

20. The one or more non-transitory machine-readable media recited in claim 19, wherein the transferring of the at least the portion of the respective plurality of data blocks associated with the first snapshot includes transferring the first portion of data blocks.

* * * * *